United States Patent
Chatufale

(10) Patent No.: US 6,659,419 B2
(45) Date of Patent: Dec. 9, 2003

(54) HYDRAULIC DOUBLE ACTING VALVE ACTUATOR

(75) Inventor: Vijay Chatufale, Missouri City, TX (US)

(73) Assignee: HP&T Products, Inc., Stafford, TX (US)

(*) Notice: Subject to any disclaimer, the term of this patent is extended or adjusted under 35 U.S.C. 154(b) by 202 days.

(21) Appl. No.: 10/027,060

(22) Filed: Dec. 26, 2001

(65) Prior Publication Data

US 2003/0116732 A1 Jun. 26, 2003

(51) Int. Cl.$^7$ ............................................. F16K 31/00
(52) U.S. Cl. ..................... 251/14; 251/291; 222/334; 222/504
(58) Field of Search .................. 251/14, 291; 222/334, 222/504

(56) References Cited

U.S. PATENT DOCUMENTS

| | | | | |
|---|---|---|---|---|
| 2,733,041 A | * | 1/1956 | Crookston | 251/14 |
| 3,958,592 A | * | 5/1976 | Wells et al. | 137/315.3 |
| 4,066,188 A | * | 1/1978 | Scholl et al. | 222/146.5 |
| 4,678,100 A | * | 7/1987 | Gelinas et al. | 222/52 |
| 4,827,963 A | * | 5/1989 | Baker et al. | 137/75 |
| 4,836,243 A | * | 6/1989 | Ferrell | 137/556 |
| 5,205,439 A | * | 4/1993 | Sturm | 222/1 |
| 5,467,899 A | * | 11/1995 | Miller | 222/309 |
| 6,079,596 A | * | 6/2000 | Dedoes | 222/309 |
| 6,334,554 B1 | * | 1/2002 | Bolyard et al. | 222/389 |

OTHER PUBLICATIONS

Parker, sales brochure for "Polypak Seals", unknown publisher and date, 2 pages.
Parker, sales brochure for "Molygard Wear Rings", unknown publisher and date, 2 pages.
Control Flow, sales brochure for "Hydraulic BWH", unknown publisher and date, 1 page.
Simply Superior, sales brochure for "Magnum Gate Valve", unknown publisher and date, 1 page.
Cameron Iron Works, Inc., sales brochure for "Hydraulically Actuated Gate Valve", SD–156, unknown publisher and date, 1 page.
Cameron Iron Works, Inc., sales brochure for "Hydraulically Actuated Gate Valve", SD–2337–01, unknown publisher and date, 1 page.

* cited by examiner

*Primary Examiner*—Joseph A. Kaufman
(74) *Attorney, Agent, or Firm*—Slater & Matsil, L.L.P.

(57) ABSTRACT

A modular portion (71) of a hydraulic valve actuator (64) comprises a hollow cylinder portion (74), a piston (78), a cylinder head portion (80), and a piston retainer portion (88). The piston (78) is located in the cylinder portion (74), and the piston (78) is adapted to slidably fit in the cylinder portion (74). The cylinder head portion (80) closes a second end (110) of the cylinder portion (74). The piston retainer portion (88) is located at an interior surface (134) of the cylinder portion (74) and at a first end (106) of the cylinder portion (74). Part of the piston retainer portion (88) extends radially inward relative to the interior surface (134) of the cylinder portion (74) farther than a portion of the piston (78) such that the piston (78) cannot slide completely past the piston retainer portion (88). Thus, the piston retainer portion (88) keeps the piston (78) within the cylinder portion (74) when the actuator (64) is disassembled for repair or replacement of seals, and when the modular actuator portion (71) is operably assembled.

26 Claims, 6 Drawing Sheets

HYDRAULIC DOUBLE ACTING VALVE ACTUATOR

FIELD OF THE INVENTION

The present invention relates to a modular hydraulic actuator for a valve.

BACKGROUND

Hydraulically actuated valve assemblies are often used in the oil industry, among other uses, to control the flow of oil. In a typical assembly 20 having a double-acting hydraulic actuator 22 for example, as shown in FIGS. 1 and 2, a piston 24 inside the actuator 22 is driven on either side by pressurized hydraulic fluid entering either of two hydraulic fluid ports 26, 28. Pressurized hydraulic fluid entering the cylinder 30 through the upper port 26 causes the piston 24 to move down (away from the upper port 26). Because an operating stem 32 is coupled to the piston 24, downward movement of the piston 24 causes downward movement of the operation stem 32, which in turn causes downward movement of a gate 34 coupled to the other end of the operating stem 32. Similarly, pressurized hydraulic fluid entering the cylinder 30 through the lower port 28 causes the piston 24, as well as the operating stem 32 and gate 34, to move upward.

Therefore, one end 36 of the operating stem is exposed to pressure within the cylinder 30 from the pressurized hydraulic fluid during actuation of the valve 34, which may be as high as 3000 psi, for example. The other end 38 of the operating stem 38 is exposed to pressurized fluids flowing through the valve 34, which can be as high as 30,000 psi. The operating stem is reciprocating up and down as valve opens and closes. The wear of the stem packing is directly proportional to the number of open/close cycles the valve experiences. The seals are non-metallic and therefore, experience quick wear. Thus, these seals 40 around the operating stem 32 need replacement quite often during the life of the assembly 20.

FIG. 2 shows an exploded view of the assembly 20 of FIG. 1. To access the seals 40 around the operating stem 32 at the lower portion of the actuator 22 shown in FIGS. 1 and 2 (e.g., for replacing the seals 40), at least the following steps are required (the order may vary). The six nuts 42 and corresponding studs 44 located about the hydraulic cylinder 30 are removed. Then the hydraulic cylinder 30 is removed and separated from the piston 24, which remains attached to the operating stem 32. A set screw 46 holding a centering pin 48 on the upper end 36 of the operating stem 32 is loosened or removed. The centering pin 48 is removed from the upper end 36 of the operating stem 32. The piston lock nut 50, which retains the piston 24 on the operating stem 32, is removed. The piston 24 is unscrewed and removed from the upper end 36 of the operating stem 32. Finally, the packing gland 52, which holds the stem packing 54 and other seals 40 in place, is unscrewed. With the packing gland 52 unscrewed and/or removed, the stem packing 54 and the seals 40 held by the packing gland 52 can be accessed and replaced, if needed.

Note that to get to the step when the packing gland 52 is unscrewed, the piston 24 had to be separated from the cylinder 30. Therefore, the piston rings or seals that provide a seal between one side of the piston 24 in the cylinder 30 and another become unseated when the piston 24 is separated from the cylinder 30. Thus, upon reassembly of the actuator 22, the piston rings and/or seals must be reseated or may even need replacement after being unseated. Reseating piston rings and seals when installing a piston 24 into a cylinder 30 is often a cumbersome procedure requiring special tools to ensure that the piston rings and seals seat properly and are not damaged in the process. Therefore, because accessing the packing gland 52 and its associated seals 40 in existing hydraulically actuated valve assemblies unnecessarily requires the piston 24 to be removed from the cylinder 30, there is a need for a hydraulically actuated valve assembly that allows the packing gland 52 and its associated seals 40 to be accessed without requiring the actuator 22 to be disassembled or without requiring that the piston 24 be removed from the cylinder 30.

Also, note that accessing the packing gland 52 and its associated seals 40 for replacement in the existing hydraulically actuated valve assembly 20 requires numerous steps and the removal of numerous parts. Typically, the packing gland 52 and its associated seals 40 are replaced in the field (e.g., on an oil rig platform). Because the environment in the field is not always conducive to the disassembly and reassembly of a complex device and parts can be easily lost, there is a need for a hydraulically actuated valve assembly that allows the packing gland 52 and its associated seals 40 to be accessed more easily, faster, and requiring fewer components of the actuator to be disassembled in the process.

Furthermore, in the field, often as many as a dozen or more hydraulically actuated valve assemblies may receive maintenance at one time. Thus, if numerous hydraulically actuated valve assemblies are disassembled and the parts for these get mixed together or mixed-up, the likelihood that a previously seated piston assembly will match or mate with a different cylinder may be low. A mismatch between a used piston assembly and a used cylinder can affect the performance of the actuator, and it may make reassembly difficult. Therefore, it would be better in most cases not to separate the piston assembly from its cylinder if it is not needed.

In addition, there are the economic considerations. The time that it takes to disassemble a hydraulically actuated valve assembly for maintenance requires production downtime, as well as labor time for skilled technicians in the field. Furthermore, there is cost involved with supplying special tools and training for these technicians to perform their tasks. Therefore, it is desirable to have a hydraulically actuated valve assembly where the packing gland and its associated seals can be more quickly and more easily accessed for maintenance, without the need to remove the piston from the cylinder.

BRIEF SUMMARY OF THE INVENTION

The problems and needs outlined above are addressed by the present invention. In accordance with one aspect of the present invention, a modular portion of a hydraulic valve actuator is provided. The modular actuator portion comprises a hollow cylinder portion, a piston, a cylinder head portion, and a piston retainer portion. The cylinder portion has a first end and a second end. The piston is located in the cylinder portion, and the piston is adapted to slidably fit in the cylinder portion. The piston has a slotted portion formed therein. For example, the slotted portion of the piston may have a generally T-shaped cross-section. The cylinder head portion closes the second end of the cylinder portion. The piston retainer portion is located at an interior surface of the cylinder portion and at the first end of the cylinder portion. Part of the piston retainer portion extends radially inward relative to the interior surface of the cylinder portion farther than a portion of the piston such that the piston cannot slide completely past the piston retainer portion. Thus, the piston retainer portion keeps the piston within the cylinder portion when the modular actuator portion is operably assembled.

In other embodiments, the modular actuator portion may further comprise a cylinder retainer portion and/or a locking screw. The cylinder retainer portion is located along an outside surface of the cylinder portion and at the first end of the cylinder portion. The cylinder retainer portion has a plurality of screw holes formed therein. The locking screw extends at least partially through the cylinder head portion and is threadedly coupled to the cylinder head portion. The locking screw is adapted to press against the piston with an end of the locking screw to displace the piston when needed.

In other embodiments, the modular actuator portion may further comprise a handle, one or more hydraulic fluid ports, and/or a retainer ring. The handle may be removably coupled to a distal end of the locking screw. The one or more hydraulic fluid ports may extend through a wall of the cylinder portion and/or through the cylinder head portion. In other embodiments of the present invention, the cylinder portion and the cylinder head portion may be integral parts of a single component, the cylinder portion and the cylinder retainer portion may be integral parts of a single component, and/or the cylinder portion and the piston retainer portion may be integral parts of a single component. Alternatively, the cylinder portion, the cylinder retainer portion, the cylinder head portion, and the piston retainer portion may be separable parts.

In accordance with another aspect of the present invention, a modular hydraulic actuator is provided. The modular hydraulic actuator comprises a first modular actuation portion and a second modular actuation portion. The first modular actuation portion comprises a hollow cylinder portion, a cylinder retainer portion, a piston, a cylinder head portion, a locking screw, and a piston retainer portion. The cylinder retainer portion is located along an outside surface of the cylinder portion and at a first end of the cylinder portion. The cylinder retainer portion has a plurality of screw holes formed therein. The piston is located in the cylinder portion, and is adapted to slidably fit in the cylinder portion. The piston has a slotted portion formed therein. The cylinder head portion closes a second end of the cylinder portion. The locking screw extends through the cylinder head portion and threadedly couples to the cylinder head portion. The locking screw is adapted to press against the piston with an end of the locking screw to displace the piston. The piston retainer portion is located at an interior surface of the cylinder portion and at the first end of the cylinder portion. Part of the piston retainer portion extends radially inward relative to the interior surface farther than a portion of the piston such that the piston cannot slide completely past the piston retainer portion. The second modular actuator portion comprises a bonnet portion, an operating stem, and a nut. The bonnet portion has a central hole formed therethrough. The bonnet portion has a plurality of screw holes formed therein at one end of the bonnet portion. The bonnet portion screw holes correspond to the cylinder retainer portion screw holes. The operating stem extends through the bonnet portion central hole. The operating stem has a first end removably coupled to the valve member. The operating stem has a threaded second end. The nut has an exterior shape adapted to slidably interfit with the slotted piston portion. The nut has a threaded hole formed therein that is threadedly coupled with the threaded second end of the operating stem. The first modular actuator portion is removably coupled to the second modular actuator portion with a plurality of fasteners via the cylinder retainer screw holes and the bonnet screw holes. The first modular actuator portion can be separated from the second modular actuator portion without disassembling the first modular portion. Similarly, the second modular actuator portion may be separated from the first modular actuator portion without disassembling the second modular actuator portion.

Regarding other embodiments, the first modular portion may have one or more hydraulic fluid ports formed therein. The bonnet portion of the second modular portion may have a hydraulic fluid port formed therein. The slotted portion of the piston may have a generally T-shaped cross-section, and the exterior shape of the nut may have a generally T-shaped cross-section corresponding to the cross-section of the slotted piston portion. The second modular actuator portion may further comprise a packing gland threadedly coupled into the bonnet portion about the operating stem, wherein the packing gland is adapted to retain at least one seal. Also, the second modular actuator portion may further comprise a drift ring located about the operating stem and threadedly engaged with the bonnet portion for the purpose of limiting the stroke of the piston when the actuator is operably assembled. The bonnet portion may be adapted to removably attach to a valve housing. The plurality of fasteners may comprise cap screws, wherein the bonnet portion screw holes have threads formed therein adapted to threadedly engage with the cap screws. In alternative, the plurality of fasteners may comprise studs extending from the bonnet portion and fastener nuts adapted to threadedly engage with a threaded portion of the studs. Or, the plurality of fasteners may comprise bolts with accompanying fastener nuts.

In accordance with another aspect of the present invention, a hydraulically actuated valve assembly is provided. The hydraulically actuated valve assembly comprises a valve component and a modular hydraulic actuator comprising a first modular portion and a second modular portion. The valve component comprises a valve body and a valve member. The valve body has a plurality of screw holes formed therein. The valve member is located in the valve body and slidably fits in the valve body. The first modular actuator portion of the modular hydraulic actuator is as described above for the modular hydraulic actuator. As above, the second modular actuator portion comprises a bonnet portion, an operating stem, and a nut. The bonnet portion has a central hole formed therethrough, and has a first plurality of screw holes formed therein at a first end of the bonnet portion. The first plurality of bonnet portion screw holes corresponds to the cylinder retainer portion screw holes. The bonnet portion also has a second plurality of screw holes formed therein at a second end of the bonnet portion, wherein the second plurality of bonnet portion screw holes corresponds to the valve body screw holes. The operating stem extends through the bonnet portion central hole, and the operating stem has a first end removably coupled to the valve member. The operating stem has a threaded second end. The nut has an exterior shape adapted to slidably interfit with the slotted piston portion, and the nut has a threaded hole formed therein that is threadedly coupled with the threaded second end of the operating stem. Again, the first modular actuator portion is removably coupled to the second modular actuator portion with a first plurality of fasteners via the cylinder retainer screw holes and the first bonnet screw holes, and the first modular actuator portion can be separated from the second modular actuator portion without disassembling the first modular portion. The first plurality of fasteners may comprise cap screws, wherein the first bonnet portion screw holes have threads formed therein adapted to threadedly engage with the cap screws. In alternative, the first plurality of fasteners may comprise studs extending from the bonnet portion and fastener nuts adapted to threadedly engage with a threaded portion of the studs. Likewise, the first plurality of fasteners may comprise bolts with accompanying fastener nuts. The second modular actuator portion is removably coupled to the valve body with a second plurality of fasteners via the second bonnet screw holes and the valve body screw holes. The second plurality of fasteners may comprise cap screws, studs with corresponding fastener nuts, and/or bolts with accompanying fastener nuts. The valve member may be a gate valve.

In accordance with another aspect of the present invention, a method of disassembling a modular actuator component for accessing at least one seal in the modular actuator component is provided. The method comprises the following steps, the order of which may vary:

(i) loosening a plurality of fasteners that hold a first modular portion of the actuator component and a second modular portion of the actuator component together. The first modular actuator portion comprises: a hollow cylinder portion, a piston located in the cylinder portion, the piston being adapted to slidably fit in the cylinder portion, and the piston having a slotted portion formed therein, a piston retainer portion located at an interior surface of the cylinder portion and at a first end of the cylinder portion, wherein part of the piston retainer portion extends radially inward relative to the interior surface farther than a portion of the piston such that the piston cannot slide completely past the piston retainer portion, a cylinder head portion closing a second end of the cylinder portion, and a locking screw extending through the cylinder head portion and threadedly coupled to the cylinder head portion, the locking screw being adapted to press against the piston with a first end of the locking screw for displacing the piston. The second modular actuator portion comprises: a bonnet portion having a central hole formed therethrough, an operating stem extending through the bonnet portion central hole, the operating stem having a threaded end, a nut having an exterior shape that is slidably engaged with the slotted piston portion, and the nut having a threaded hole formed therein that threadedly interfits with the threaded operating stem end, and the at least one seal located about the operating stem;

(ii) displacing the piston towards the first end of the first modular portion until the slotted piston portion extends outside of the first modular portion;

(iii) preventing the piston from being completely slid out of the first modular portion through the first end of the cylinder portion with the piston retainer portion;

(iv) sliding the nut out of engagement with the slotted piston portion; and (v) separating the first modular portion from the second modular portion.

The plurality of fasteners may comprise cap screws, and the method may further comprise the step of (vi) removing the cap screws after the loosening step. The second modular portion may have a plurality of studs extending therefrom, wherein the plurality of fasteners are fastener nuts adapted to threadedly engage the studs, and the method may further comprise the step of (vi) removing the fastener nuts. The plurality of fasteners may comprise bolts with accompanying fastener nuts, and the method may further comprise the step of (vi) removing the fastener nuts. Or, the plurality of fasteners may comprise a clamping mechanism, and the method may further comprise the step of (vi) opening the clamping mechanism. The second modular portion may further comprise a packing gland, the packing gland being located about the operating stem and threadedly engaged with the bonnet portion, wherein the packing gland retains the at least one seal, and the method may further comprise the step of (vi) unthreading and removing the packing gland from the second modular portion. Also, the second modular portion may further comprise a drift ring, the drift ring being located about the operating stem and threadedly engaged with the bonnet portion for the purpose of limiting the stroke of the piston when the actuator component is operably assembled, and the method may further comprise the step of (vii) unthreading and removing the drift ring from the second modular portion. The method may further comprise the step of removing the nut from the operating stem. During the displacing piston step, the locking screw may be rotated manually rotated via a handle coupled to the locking screw so that the locking screw moves toward the piston, presses against the piston, and displaces the piston.

BRIEF DESCRIPTION OF THE DRAWINGS

The above features of the present invention will be more clearly understood from consideration of the following descriptions in connection with accompanying drawings in which.

DETAILED DESCRIPTION OF THE INVENTION

Figure 1:
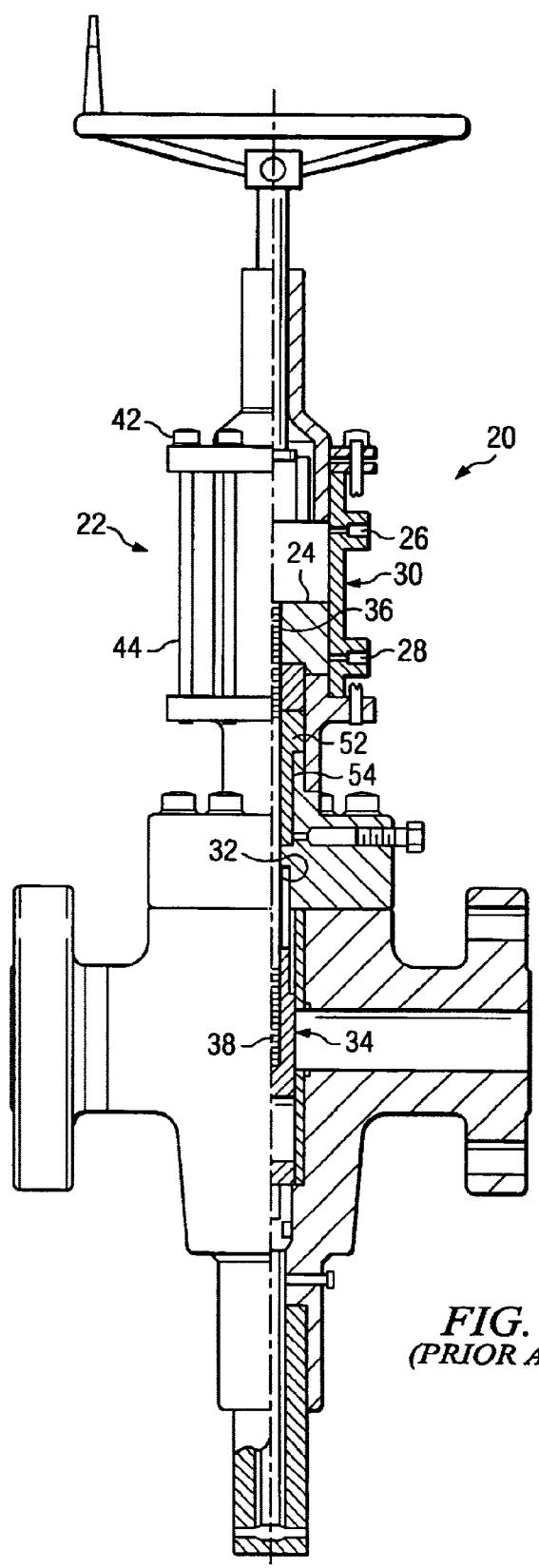
FIG. 1 is a schematic showing a partially cut-away view of a hydraulically actuated valve assembly in the prior art.
Figure 2:
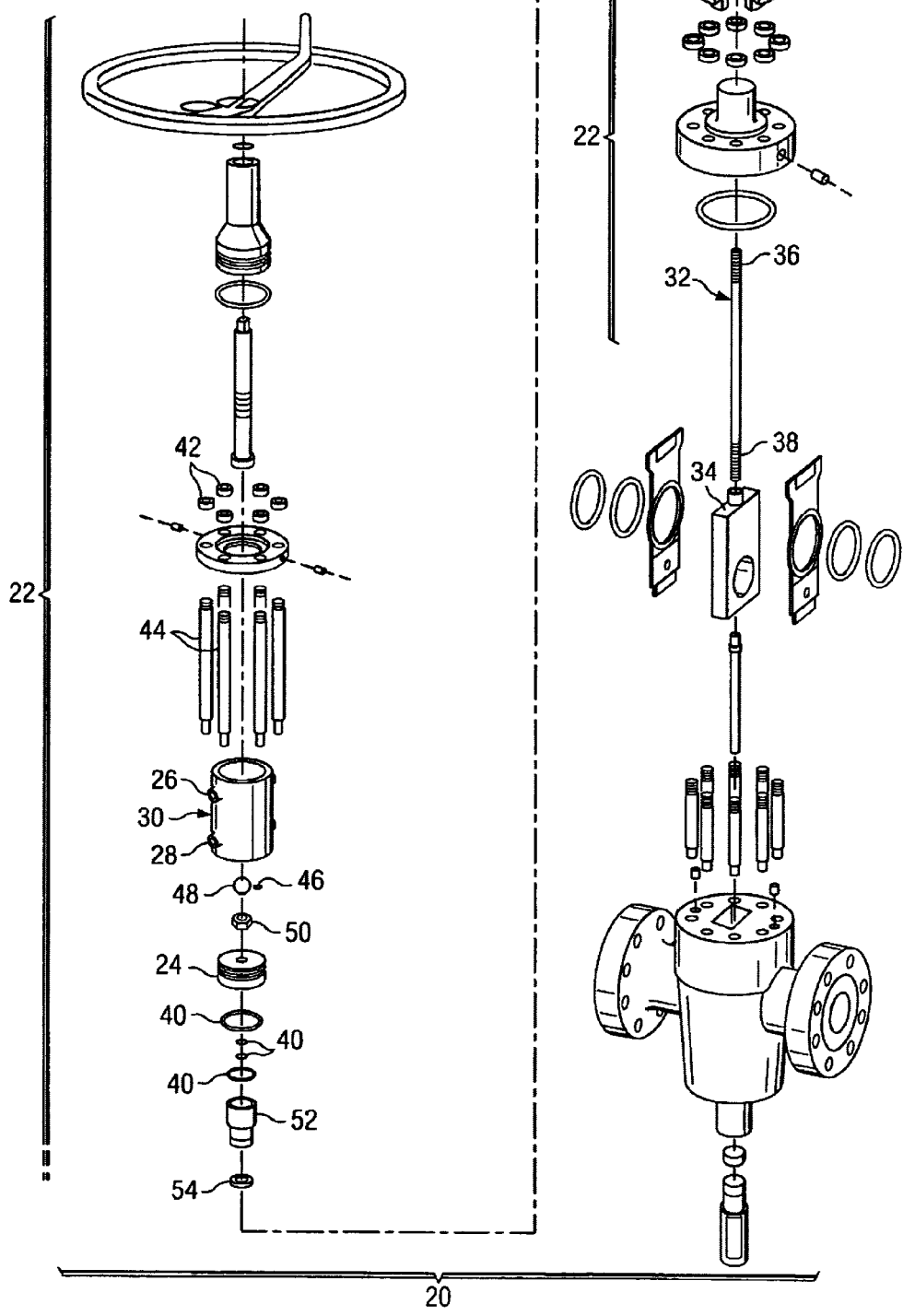
FIG. 2 is a schematic showing an exploded perspective view of the hydraulically actuated valve assembly of FIG. 1.

Referring now to the drawings, wherein like reference numbers are used herein to designate like elements throughout the various views, a preferred embodiment of the present invention is illustrated and described, and other embodiments of the present invention are described as well. As will be understood by one of ordinary skill in the art, the figures are not necessarily drawn to scale, and in some instances the drawings have been exaggerated and/or simplified in places for illustrative purposes only. One of ordinary skill in the art will appreciate the many applications and variations of the present invention in light of the following description of the preferred embodiment and other embodiments of the present invention.

Note that the term "end" is used herein to generically refer to or call out a general side, portion, section, region, tip, and/or location of or along a component. For example, a part coupled to a first "end" of a component may be located at any chosen place along or on the component designated as the first end, which may or may not encompass a most distal edge or tip of the component. As another example, consider a hypothetical shaft divided into two regions designated as a first end and a second end, and having a part coupled to the first end (and not coupled to the second end). The part may be located at a most distal tip of the shaft at the first end, or at any other location along the shaft at the first end. In this shaft example, the first end of the shaft is a first region or section of or along the shaft extending from a most distal tip of the shaft to the location along the shaft where the second end begins. Likewise, the second end of the shaft is a second region or section of the shaft extending from the other most distal tip of the shaft to the location along the shaft where the first end begins. Therefore, if someone grabs the first end of the shaft, he or she is not necessarily grabbing the shaft at one of the most distal tips, but rather on one of the sides or portions of the shaft arbitrarily defined as the first end in the context.

Generally, the present invention provides a modular hydraulic actuator that can be disassembled and separated into two modular portions so that the packing gland and its associated seals (e.g., stem packing, o-rings) can be accessed and replaced without requiring the removal of other major components of the actuator (e.g., without having to remove the piston from the cylinder). The following description and FIGS. 3–8 pertain to a preferred embodiment of the present invention. The preferred embodiment discussed herein is but one illustrative example of the present invention and does not limit the scope of the invention to the preferred embodiment described.

Figure 3:
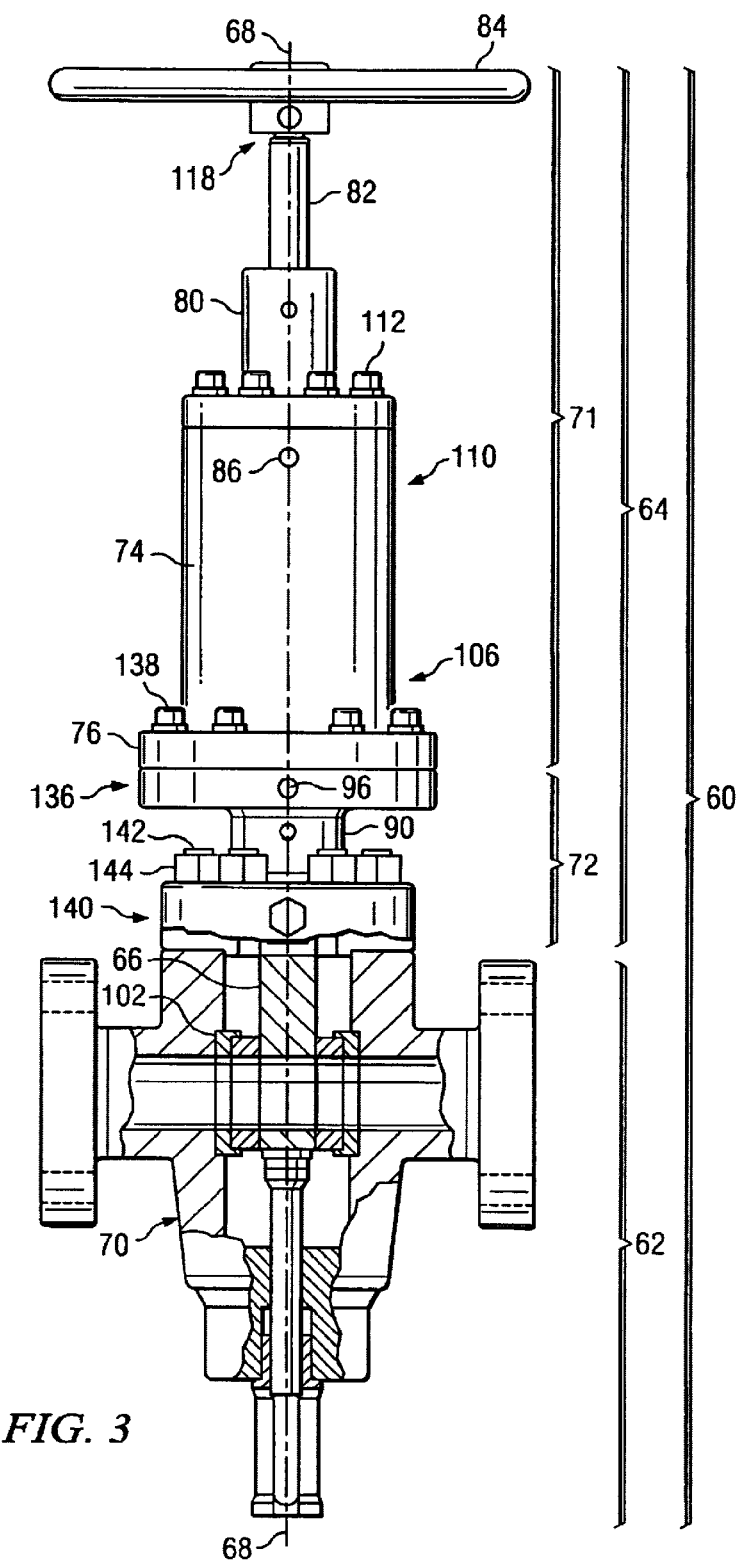
FIG. 3 is a schematic showing a partially cut-away view of a hydraulically actuated valve assembly in accordance with a preferred embodiment of the present invention.

FIG. 3 shows a side view of a hydraulically actuated valve assembly 60, which is a preferred embodiment in accordance with the present invention. The assembly 60 comprises a valve component 62 and a modular hydraulic actuator 64. A portion of the valve component 62 is cut-away for purposes of illustration to show some of its internal details. The valve component 62 in this application comprises a gate valve member 66 that is adapted to slide along a central axis 68 of the assembly 60 within a valve body 70. The type of valve component 62 shown in FIG. 3 is typically referred to as a "gate valve." The gate valve 62 of FIG. 3 is shown in a fully open position. Many different gate valve designs exist, any of which may be substituted for the gate valve 62 shown in FIG. 3 to create other embodiments of the present invention. Also, there are many other types of valves components, other than gate valve types, that may also be incorporated with the present invention to form other embodiments. Some examples of other types of valve components include (but are not necessarily limited to) plug valves and ball valves, as examples.

Figure 4:
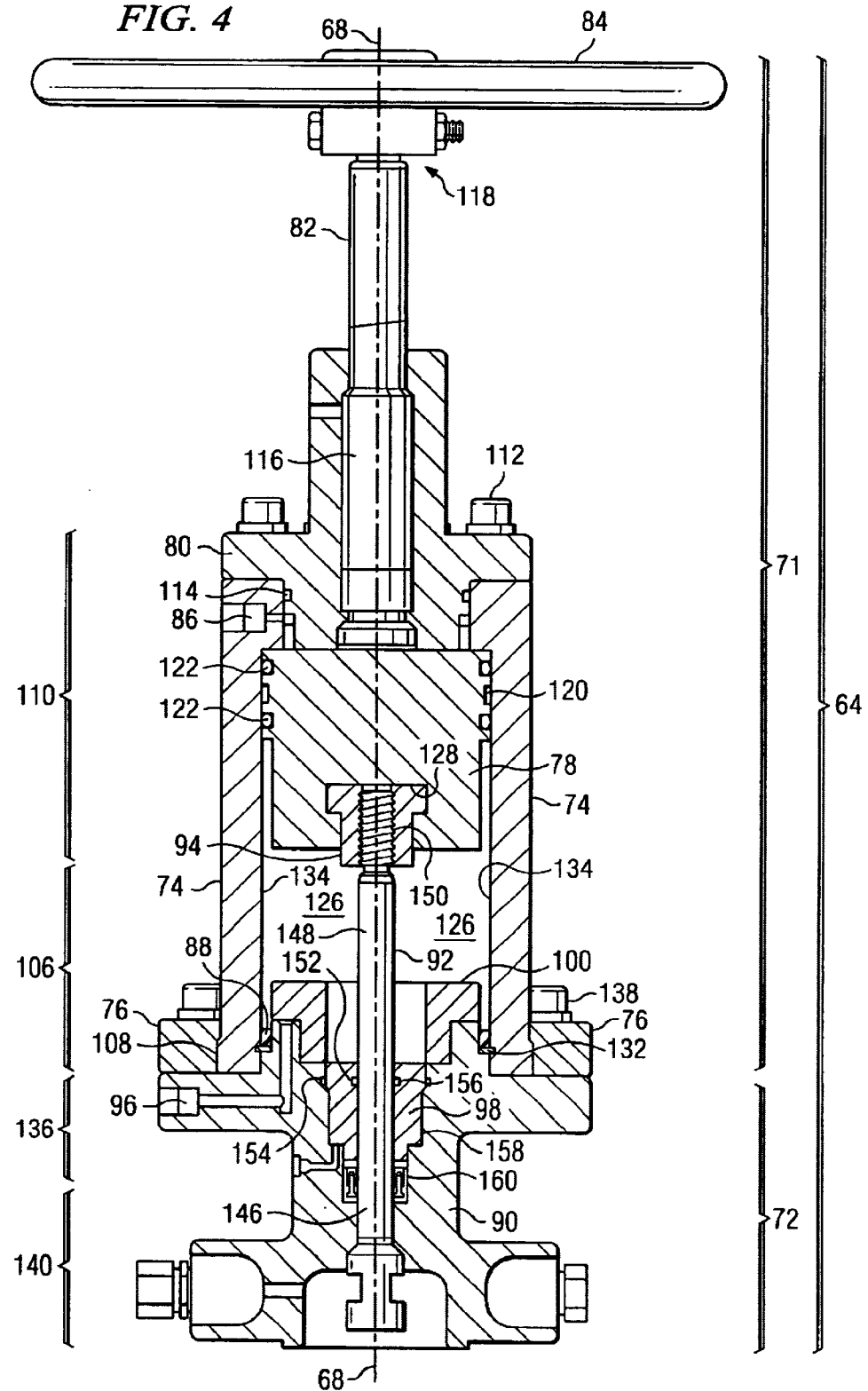
FIG. 4 is a schematic showing an enlarged, partially cut-away view of the actuator from the preferred embodiment of FIG. 3.

In FIG. 3, the actuator 64 is attached to the valve body 70. The description of the way the actuator 64 is attached to the valve body 70 is discussed below. FIG. 4 shows an enlarged, partially cut-away view of the modular hydraulic actuator 64 of FIG. 3.

Figure 5:
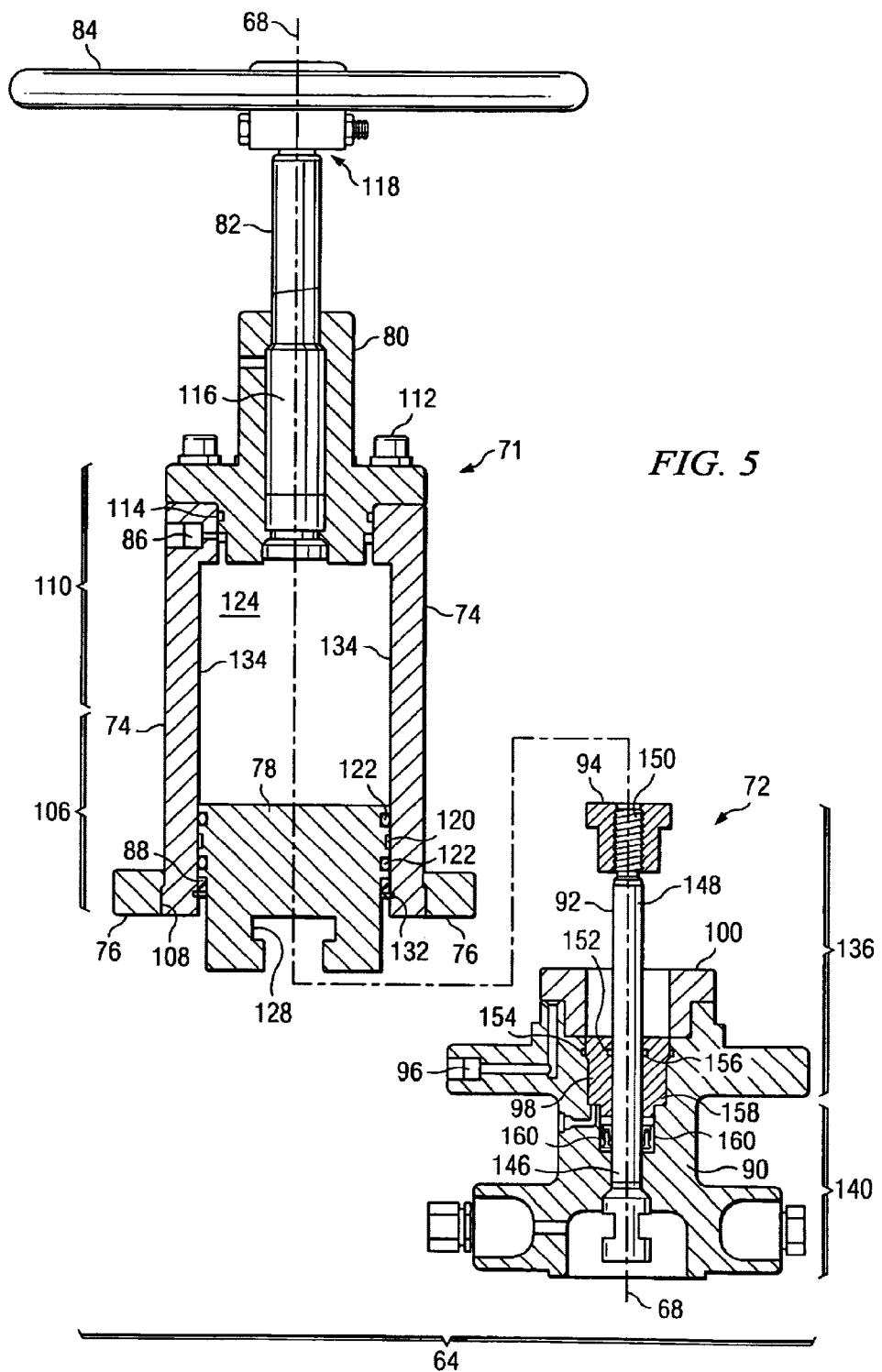
FIG. 5 is a schematic showing the actuator of FIG. 4 separated into two modular portions.

The operably assembled modular actuator 64 of FIG. 4 can be divided or separated into two modular portions 71, 72 as shown in FIG. 5. A method of disassembling the modular actuator 64 for maintenance will be described below. As shown in FIGS. 4 and 5, a first modular portion 71 of the actuator 64 comprises a hollow cylinder portion 74, a cylinder retainer portion 76, a piston 78, a cylinder head portion 80, a locking screw 82, a hand wheel 84, a first hydraulic fluid port 86, and a piston retainer portion 88. A second modular portion 72 of the actuator 64 comprises a bonnet portion 90, an operating stem 92, a T-nut 94, a second hydraulic fluid port 96, a packing gland 98, and a drift ring 100. The description of these modular portion elements and their interactions with each other in forming the assembly 60 is provided below.

The modular actuator portions 71, 72 also comprise numerous seals, which are vital to keeping the actuator and valve assembly 60 functional. Other than the valve seal 102 at the gate valve member 66 and perhaps the particular arrangement, orientation, placement, and/or combination of the seals, the seals themselves are commercially available and known to those of ordinary skill in the art. Therefore, the details of the seals themselves are not described in detail herein. For a more detailed discussion of gate valve seal 102 at the gate valve member 66 (see FIG. 3), please refer to commonly-assigned U.S. patent application Ser. No. 09/911, 148 entitled *Valve Seal Assemblies and Methods* by Vijay Chatufale filed on Jul. 23, 2001, incorporated by reference herein.

Referring to FIGS. 4 and 5, and focusing on the first modular actuator portion 71, the cylinder retainer portion 76 is located at the first end 106 of the hollow cylinder portion 74 and about the outside of the cylinder portion 74. The cylinder retainer portion 76 includes a plurality of screw holes formed therein (not shown). The cylinder retainer portion 76 shown in the preferred embodiment is a separate ring-shaped member that fits over the outside of the cylinder portion 74. On the outside of the first end 106 of the cylinder portion 74, a lip protrusion 108 extends around the circumference of the cylinder portion 74. The cylinder retainer portion 76 is adapted to clamp down on the lip protrusion 108 of the cylinder portion 74 when it is operably installed in the assembly 60. However, in other embodiments of the present invention, the cylinder retainer portion 76 may be an integral part of the cylinder portion 74. Also, the cylinder retainer portion 76 may engage or may be coupled to the cylinder portion 74 in other ways, such as being threaded onto the exterior of the cylinder portion (not shown).

At a second end 110 of the cylinder portion 74, a cylinder head portion 80 closes the second end 110 of the cylinder portion 74. The cylinder head portion 80 shown in the preferred embodiment includes a plurality of screw holes (not shown) formed therein about the central axis 68. The second end 110 of the cylinder portion 74 also includes a plurality of screw holes (not shown) formed therein that correspond to the cylinder head screw holes. The cylinder screw holes at the second end 110 are threaded. A plurality of cap screws 112 extend through the cylinder head screw holes and threadedly engage with the threaded cylinder screw holes at the second end 110 of the cylinder portion 74, which couples the cylinder head portion 80 to the cylinder portion 74 and closes the second end 110. Seals 114 are coupled between the cylinder head portion 80 and the cylinder portion 74 to seal the closed second end 110. However, as with the cylinder retainer portion 76, the cylinder head portion 80 may be an integral part of the cylinder portion 74 in other embodiments of the present invention. Furthermore, in other embodiments, the cylinder head portion 80, the cylinder portion 74, and the cylinder retainer portion 76 may be integral parts of a single component. Also, the cylinder head portion 80 may close or may be coupled to the second cylinder end 110 in other ways (not shown), such as the cylinder head portion 80 being clamped to, threaded into, and/or threaded onto the cylinder portion 74.

A portion 116 of the locking screw 82 includes threads formed thereon and the threaded portion 116 of the locking screw 82 threadedly engages with a threaded hole formed in the cylinder head portion 80 along the central axis 68. Thus, the locking screw 82 moves along the central axis 68 as it is rotated. The primary function of the locking screw 82 is to press against the piston 78 and push it towards the first end 106 of the cylinder portion 74 when the locking screw 82 is rotated clockwise (or counter-clockwise, depending on the orientation of the threads). A distal end 118 of the locking screw 82 has a hand wheel 84 removably coupled thereon. Therefore, the locking screw 82 provides a way to manually push the piston 78 toward the first cylinder end 106, if needed or desired, which will in-turn move the valve 66 towards a closed position.

The piston 78 is located in the hollow cylinder portion 74. When operably installed, the piston 78 is adapted to slidably fit within the cylinder portion 74. The piston has a wear ring 120 and seals (piston rings) 122 thereon, which isolate and seal an upper chamber 124 formed above the piston 78 within the cylinder portion 74 from a lower chamber 126 formed below the piston 78 within the cylinder portion 74. The piston wear ring 120 and seals 122 themselves are commercially available and known to those of ordinary skill in the art. Therefore, the details of the piston wear ring 120 and seals 122 themselves need not be described in detail herein.

Figure 6:
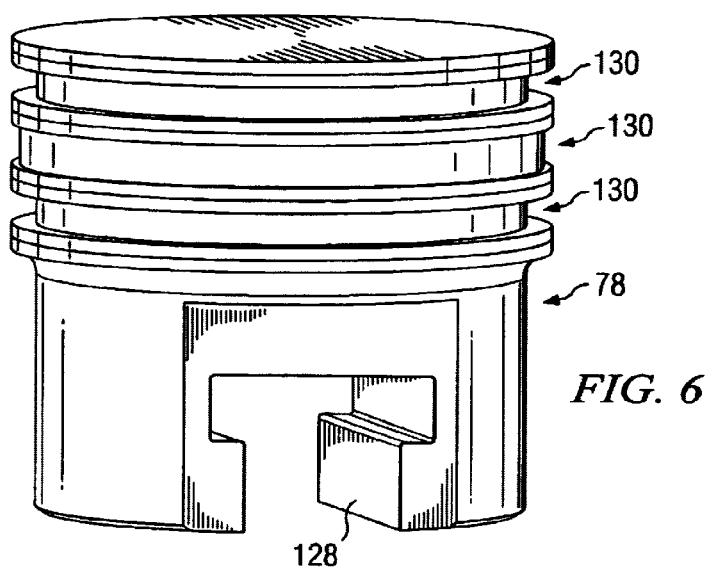
FIG. 6 is a schematic showing an enlarged, perspective view of the piston from the actuator of FIGS. 3–5.

FIG. 6 is an enlarged perspective view of the piston 78 of FIGS. 4 and 5. As best seen in FIGS. 5 and 6, the piston 78 includes a slotted portion 128 formed therein. The slotted portion 128 of the piston 78 has a generally T-shaped cross-section. The primary function of the slotted portion 128 of the piston 78 will be explained further below. The grooves 130 that retain the piston wear ring 120 and seals 122 can be seen in FIG. 6.

Referring again to FIGS. 4 and 5, the first hydraulic fluid port 86 is formed in a side of the cylinder portion 74 (through a cylinder wall). The first hydraulic fluid port 86 provides a passage to input pressurized hydraulic fluid into and output hydraulic fluid from the upper chamber 124 formed within the hollow cylinder portion 74 above the piston 78.

The piston retainer portion 88 of the first modular portion 71 is located in the cylinder portion 74 at its first end 106. As best shown in FIG. 5, one function of the piston retainer portion 88 is to prevent the piston 78 from completely sliding out of the cylinder portion 74 at the first cylinder end 106. Advantages of incorporating the piston retainer portion 88 into the present invention will be discussed below. In the preferred embodiment shown, the piston retainer portion 88 is a generally ring-shaped member having an inner diameter smaller than an outer diameter of at least part of the piston 78. Therefore, the piston 78 cannot slide completely past or through the piston retainer portion 88. A conventional snap ring 132 fits into a groove (not shown) formed in an interior surface 134 of the cylinder portion 74. When operably installed, at least part of the snap ring 132 has an outer diameter larger than the diameter of the cylinder's interior surface 134, which retains the snap ring 132 in the groove formed in the cylinder's interior surface 134. Also, at least part of the snap ring 132 has an inner diameter smaller than the outer diameter of the piston retainer portion 88, which prevents the piston retainer portion 88 from sliding past the snap ring 132 at the first cylinder end 106. Thus, similar to the piston 78, the piston retainer portion 88 is free to move along the central axis 68 within the cylinder portion 74, but is restrained from sliding out of the cylinder portion 74 at the first cylinder end 106.

In other embodiments of the present invention, the piston retainer portion 88 may be held within or coupled to the interior surface 134 of the cylinder portion 74 in other ways. For example, the piston retainer portion 88 may be threaded into the first cylinder end 106 (not shown), or alternatively, the piston retainer portion 88 may be a snap ring itself (not shown). Because the piston retainer portion 88 may not experience large forces exerted on it by the piston 78 (depending on its location along the first cylinder end 106 and depending on whether a drift ring 100 is used), a snap ring may be sufficient to perform the function of preventing the piston 88 from sliding completely out of the cylinder portion 74 at its first end 106. However, the shape of the snap ring and its edges may tend to damage the lower piston seal 122 when the piston 78 is pressed against the snap ring (depending on the location of the lower piston seal 122 on the piston 78), which may lead to a need for a piston retainer portion and snap ring assembly as shown in the preferred embodiment. Furthermore, the piston retainer portion 88 may be an integral part of or an integral extension from the cylinder portion 74 (not shown). In such an embodiment, the piston 78 would need to be installed from the second end 110 (i.e., when the cylinder head portion 80 is removed), unless the piston 78 is a multiple-part component that can be constructed within the cylinder portion 74 (not shown). Also, in another embodiment, the piston retainer portion 88, the cylinder retainer portion 76, and the cylinder portion 74 may be integral parts of a single component (not shown).

Referring to FIGS. 4 and 5 again, and now focusing on the second modular actuator portion 72, the bonnet portion 90 includes a first plurality of screw holes (not shown) formed in a first end 136 thereof about the central axis 68. The first plurality of bonnet screw holes correspond to the plurality of screw holes formed in the cylinder retainer portion 76. In the preferred embodiment, the first bonnet screw holes have threads formed therein that correspond to a plurality of cap screws 13 8, and the cylinder retainer screw holes are not threaded. When the actuator 64 is operably assembled, the cap screws 138 extend through the cylinder retainer screw holes and threadedly couple in the first threaded bonnet screw holes to clamp the cylinder portion 74 against the bonnet portion 90. In another embodiment (not shown) of the present invention, there may be studs extending from the first bonnet screw holes, where the studs are threaded into or press-fitted into the first bonnet screw holes. When the actuator 64 is operably assembled the studs extend through the cylinder retainer screw holes and a plurality of fastener nuts are threadedly coupled to the studs and tightened to secure the first modular actuator portion 71 to the second modular actuator portion 72. In another embodiment (not shown), the first modular actuator portion 71 may be secured to the second modular actuator portion 72 via the first bonnet screw holes and the cylinder retainer screw holes with a set of bolts having corresponding nuts threadedly coupled thereon. In another embodiment (not shown), the first modular actuator portion 71 may be secured to the second modular actuator portion 72 by a clamping mechanism, and there may be alignment pins extending through both the first bonnet screw holes and the cylinder retainer screw holes.

Referring to FIGS. 3 and 4, the bonnet portion 90 includes a second plurality of screw holes (not shown) formed in a second end 140 thereof about the central axis 68. The valve body 70 of the valve component 62 includes a plurality of screw holes formed therein (not shown) about the central axis 68, and the valve body screw holes correspond with the second plurality of the bonnet screw holes. The valve body screw holes are threaded so that they can hold and support a plurality of studs 142 (see FIG. 3) having a corresponding thread pattern. The studs 142 are threaded into the valve body screw holes and extend from the valve body 70 through the second plurality of bonnet screw holes, which are aligned with the studs 142 and are not threaded. A plurality of corresponding nuts 144 are threaded onto the studs 142 to secure the second end 140 of the bonnet portion 90 (and thus the actuator 64) to the valve component 62. However, the actuator 64 may be coupled to the valve component 62 using other ways (not shown) that are known to those of ordinary skill in the art, including (but not limited to): cap screws extending through the second bonnet screw holes (unthreaded holes) and threading into the valve body screw holes; alignment pins threaded into the second bonnet screw holes (having threads formed therein), with the alignment pins extending through the valve body screw holes (unthreaded holes), and clamping the actuator 64 to the valve body 70 using a clamp; or any combination thereof.

The operating stem 92 extends through a central hole formed in the bonnet portion 90 along the central axis 68. The operating stem 92 is coupled to the valve member 66 on a first end 146 and the piston 78 on a second end 148, and it is one of the mechanical links between the piston 78 and the valve member 66. Therefore, when the piston 78 moves downward toward the first end 106 of the cylinder portion 74, the piston 78 pushes the operating stem 92 downward, which in turn pushes the valve member 66 downward.

Figure 7:
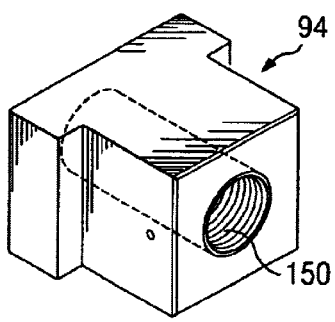
FIG. 7 is a schematic showing an enlarged, perspective view of the T-nut from the actuator of FIGS. 3–5.

The operating stem 92 is coupled to the piston 78 via the T-nut 94. FIG. 7 shows an enlarged perspective view of the T-nut 94 of FIGS. 4 and 5. The second end 148 of the operation stem 92 has threads formed thereon. The T-nut 94 had a threaded hole 150 formed therein, which is adapted to threadedly couple to the threaded second end 148 of the operating stem 92.

The T-nut 94 includes an exterior shape that is adapted to slidably interfit with the slotted portion 128 in the piston 78 when the actuator 64 is operably assembled, as shown in FIG. 4. Although the cross-section of the T-nut 94 and the slotted portion 128 of the piston 78 are generally T-shaped in the preferred embodiment, there may be other shapes that will be equivalent. For example, there are many possible cross-section shapes (not shown) for the slotted piston portion 128 and the corresponding exterior shape of the nut 94, including (but not limited to): generally Y-shaped, V-shaped, X-shaped, triangular-shaped, trapezoidal-shaped, or any other arbitrarily chosen shape that provides the same functions and results in an equivalent way. Thus, the T-nut 94 can be separated from the piston 78 by laterally sliding the T-nut 94 out of the slotted piston portion 128 (see FIGS. 4 and 5), which allows the piston 78 to be quickly released from its coupling with the operating stem 92.

Referring to FIGS. 4 and 5 again, the packing gland 98 of the second modular actuator portion 72 is located about the operating stem 92 and is threaded into the bonnet portion 90. One of the functions of the packing gland 98 is to retain numerous seals that isolate fluids in the actuator 64 from fluids in the valve component 62. At the actuator end 152 of the packing gland 98, there are two seals 154, 156. One seal 154 is located between the packing gland 98 and the bonnet portion 90, and the other seal 156 is located between the packing gland 98 and the operating stem 92. The seals 154, 156 themselves are commercially available and known to those of ordinary skill in the art, although there location and/or arrangement in the assembly may vary for a given application or design. The two seals 154, 156 at the actuator end 152 of the packing gland 98 prevent or at least hinder high-pressure fluids within the actuator 64 from leaking into the valve component 62.

Figure 8:
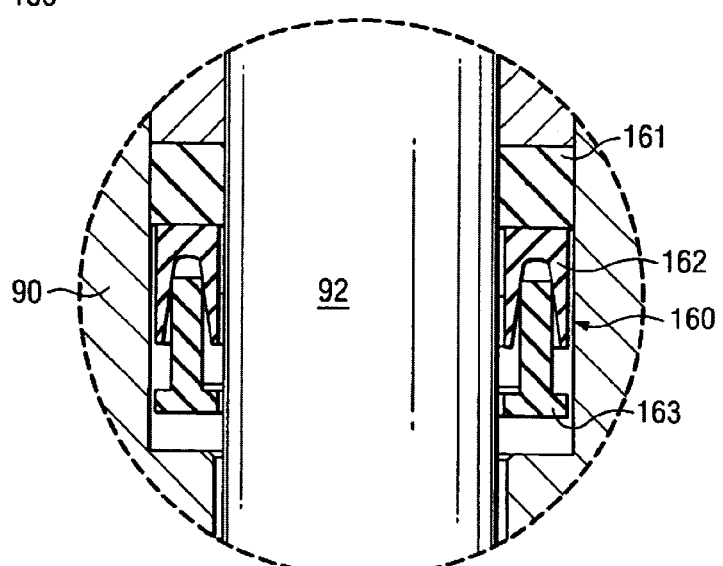
FIG. 8 is a schematic showing an enlarged, cross-section view of a portion of the actuator of FIGS. 3–5.

At the valve component end 158 of the packing gland 98, the bonnet portion 90 includes a stem packing region 160 that houses three sealing elements 161–163. As best seen in FIG. 8, which is an enlarged detail view of the stem packing region 160 of FIGS. 4 and 5, these three sealing elements 161–163 in the stem packing region 160 are located about the operating stem 92 and include a backup ring 161, a stem packing 162, and a hat ring 163. Although the location and/or arrangement of the sealing elements 161–163 in the stem packing region 160 may vary for a given application or design, the seal elements 161–163 themselves are commercially available and known to those of ordinary skill in the art. The sealing elements 161–163 in the stem packing region 160 work together to prevent or at least hinder high pressure fluids and/or gases in the valve component 62 from entering the actuator 64 along the outside of the operating stem 92 while also allowing the operating stem 92 to move along the central axis 68 relative to the bonnet portion 90. The sealing elements 161–163 may also contribute to preventing or at least hindering high pressure fluids within the actuator 64 from leaking into the valve component 62. Similarly, the two seals 154, 156 at the actuator end 106 of the packing gland 98 may contribute to preventing or at least hindering high pressure fluids and/or gases in the valve component 62 from entering the actuator 64.

The second hydraulic fluid port 96 extends through the bonnet portion 90 and opens into the lower chamber 126 formed below the piston 78 within the cylinder portion 74. The locations of the hydraulic fluid ports 86, 96 may vary in other embodiments. For example, the second port 96 may be formed through a wall of the cylinder portion 74. Similarly, the first port 86 may be formed through the cylinder head portion 80 rather than through a wall of the cylinder portion 74.

The drift ring 100 of the second modular actuator portion 72 is also located about the operating stem 92 and is threaded into the bonnet portion 90 above the packing gland 98. The primary function of the drift ring 100 is to provide a stop for the piston 78 and to limit the downward stroke of the piston 78. The stroke distance of the piston 78 needs to correlate with the size and design of the valve member 66, which typically varies with the size or flow specifications of the valve component 62. The drift ring 100 is optional (i.e., it may not be needed for some valve sizes) and its size (e.g., its height) may vary for a given application. Therefore, the optional or changeable drift ring 100 allows the same actuator components to be used for a variety of different valve sizes (i.e., for different stroke distances).

One of the advantages of the modular design of the present invention is that the first modular actuator portion 71 may be used for many different sizes of valves 62, which provides economy of scale advantages for production. To suit a variety of valve components, the second modular actuator portion 72 can be varied without needing to modify the first modular portion 71. On the bonnet portion 90, the first bonnet screw holes need not vary because the first modular actuator portion 71 is not varied. The second bonnet screw holes can be varied to match the corresponding valve body screw holes of a given valve component 62. The packing gland 98, operating stem 92, and/or drift ring 100 may or may not need to be varied, when the bonnet portion 90 is varied, to match a given valve component 62.

Another advantage of the modular design of the present invention is that the first modular actuator portion 71 can be easily replaced in the field without needing to disassemble the second modular portion 72 and without needing to remove the second modular portion 72 from the valve component 62. For example, if the piston seals 122 fail or are too worn, the first modular actuator portion 71 can be swapped with another first modular actuator portion. Then, the removed, defective first modular actuator portion can be sent to a shop for repairs or rebuilding, rather than trying to repair or rebuild the first modular actuator portion in the field. This provides yet another advantage in that there is less downtime in the event that a component fails or needs maintenance in the first modular actuator portion 71.

Another advantage of the present invention is that the first modular actuator portion 71 can be recycled or reused for a different application. For example, if the valve component 62 is being replaced but the first modular actuator portion 71 still has a lot of life left, the first modular actuator portion 71 may be installed on the new valve component along with a new second modular actuator portion 72 or bonnet portion 90, if needed (e.g., the new valve component design differs from the one being replaced), or along with the existing second modular actuator portion 72 (e.g., the new valve component design does not differ from the one being replaced).

Although the actuator 64 and valve component 62 are typically sold together as an assembly 60 (as shown in FIG. 3), due to the modular design of the present invention, the first modular actuator portion 71, second modular actuator portion 72, and/or valve component 62 may be sold or acquired separately while still providing much freedom of interchangeability among the components and parts.

The present invention thus provides a preferred method of accessing and/or replacing one or more of the seals retained by the packing gland 98. Although the order of the steps may vary, the preferred method includes the following steps (refer to FIGS. 4 and 5). First, loosen and/or remove the cap screws 13 8 holding the first modular actuator portion 71 onto the second modular actuator portion 72 (i.e., the cap screws 138 extending through the cylinder retainer portion 76).

Second, either pull the first modular actuator portion 71 away from the second modular actuator portion 72 along the central axis 68 to move the piston 78 downward toward the first cylinder end 106, or rotate the locking screw 82 with the hand wheel 84 to displace the locking screw 82 downward towards the piston 78 so that the locking screw 82 presses the piston 78 downward toward the first cylinder end 106, until the slotted portion 128 of the piston 78 extends outside of the first modular actuator portion 71 and/or until the piston 78 is stopped by the piston retainer portion 88 (see FIG. 5). The method used in the second step to displace the piston 78 downward along the central axis 68 toward the first cylinder end 106 can vary, depending on the ease of moving the piston 78. Alternatively, the piston 78 may be moved downward by inputting pressurized fluid into the upper chamber 124 above the piston 78, but this may not be practical nor safe with the cap screws 138 removed. Regardless of the method used for the second step, the desired result is to displace the piston 78 towards the first cylinder end 106 until the slotted portion 128 of the piston 78 extends outside of the first modular actuator portion 71 and/or until the piston 78 is stopped by the piston retainer portion 88.

Third, slide the T-nut 94, along with the rest of the second modular actuator portion 72, out of the slotted portion 128 of the piston 78. This may be done by moving the first modular actuator portion 71 and/or the second modular actuator portion 72, but in most cases the second modular actuator portion 72 and the valve component 62 will be fixed and restrained by a pipe or pipes (not shown) connected to the valve component 62. As shown in FIG. 5, when the slotted portion 128 of the piston 78 extends outside of the cylinder portion 74, the T-nut 94 is permitted to slide out of the slotted portion 128 and the first modular actuator portion 71 is separated from the second modular actuator portion 72. Thus, the first modular actuator portion 71 is separated from the second modular actuator portion 72 without disassembling the first modular actuator portion 71. Also, the second modular actuator portion 72 is not been disassembled at this point. Depending on the design and configuration of the second modular actuator portion 72, one or more of the seals may be accessible at this point, but that is not the case for the preferred embodiment shown in FIG. 5.

Fourth, unscrew and remove the T-nut 94 from the second end 148 of the operating stem 92. This will allow the drift ring 100 and/or the packing gland 98 to be later slid off of the operating stem 92 at its second end 148. If the second modular actuator portion 72 does not incorporate a drift ring 100 (i.e., drift ring 100 not needed for the given application), it may be possible to access and/or replace one or more of the seals without removing the packing gland 98, but rather by just loosening the packing gland 98 and sliding it upward away from the bonnet portion 90. In such case, it may not be necessary to remove the T-nut 94. Also, the drift ring 100 may have an inner diameter larger than the widest dimension of the T-nut 94 such that the drift ring 100 can be removed from the operating stem 92 without removing the T-nut 94 (i.e., sliding the drift ring 100 over and past the T-nut 94).

Fifth, if the second modular actuator portion 72 has a drift ring 100 installed, as in FIG. 5, remove the drift ring 100 by unscrewing it from the bonnet portion 90. Sixth, unscrew and move upward or remove the packing gland 98 from the bonnet portion 90. Again, one or more of the seals may or may not be accessible and/or removable without removing the packing gland 98, but rather by just sliding the packing gland 98 upward along the operating stem 92 away from the bonnet portion 90.

Yet another advantage of the present invention is the decreased likelihood that parts from the first modular actuator portion 71 removed in the field will be lost or damaged. Because actuators 64 are often disassembled in the field to access and/or replace seals retained by the packing gland 98, it is preferable and desirable that such disassembly be done with the least amount of effort, as well as with the least amount of loose parts that may be lost. The ability to remove the first modular actuator portion 71 without disassembling it addresses this desire.

Also, when performing maintenance on valve assemblies in the field, typically numerous valve assemblies are inspected and/or repaired during the same maintenance period (e.g., during downtime while the production lines are halted). Thus, when many different valve assemblies are disassembled and the removed parts are temporarily stored, parts may get mixed-up or mixed together. However, because the first modular actuator portions 71 are modular and interchangeable, and because the separate components of each first modular actuator portion 71 are not separated, swapping first modular actuator portions or mixing-up first modular actuator portions with respect to the particular valve assemblies from which they were removed is unlikely to cause any harm or problems during reassembly and operation of the assembly.

Comparing the steps required for disassembling a hydraulically-actuated valve assembly in the prior art (as described in the background section above) with the steps of disassembling a modular hydraulically-actuated valve assembly of an embodiment of the present invention reveals that the present invention results in fewer steps and provides a plethora of advantages, as described above.

It will be appreciated by those skilled in the art having the benefit of this disclosure that this invention provides a modular hydraulic actuator for a valve and a method of using it. It should be understood that the drawings and detailed description herein are to be regarded in an illustrative rather than a restrictive manner, and are not intended to limit the invention to the particular forms and examples disclosed. On the contrary, the invention includes any further modifications, changes, rearrangements, substitutions, alternatives, design choices, and embodiments apparent to those of ordinary skill in the art, without departing from the spirit and scope of this invention, as defined by the following claims. Thus, it is intended that the following claims be interpreted to embrace all such further modifications, changes, rearrangements, substitutions, alternatives, design choices, and embodiments.

What is claimed is:

1. A modular portion of a hydraulic valve actuator, comprising:
    a hollow cylinder portion;
    a cylinder retainer portion located along an outside surface of the cylinder portion and at a first end of the cylinder portion, the cylinder retainer portion having a plurality of screw holes formed therein;
    a piston located in the cylinder portion, the piston being adapted to slidably fit in the cylinder portion, and the piston having a slotted portion formed therein;
    a cylinder head portion closing a second end of the cylinder portion;
    a locking screw extending at least partially through the cylinder head portion and threadedly coupled to the cylinder head portion, the locking screw being adapted to press against the piston with an end of the locking screw to displace the piston; and
    a piston retainer portion located at an interior surface of the cylinder portion and at the first end of the cylinder portion, wherein part of the piston retainer portion extends radially inward relative to the interior surface farther than a portion of the piston such that the piston cannot slide completely past the piston retainer portion.

2. The modular actuator portion of claim 1, further comprising:
    a handle removably coupled to another end of the locking screw.

3. The modular actuator portion of claim 1, further comprising:
    a hydraulic fluid port formed therein.

4. The modular actuator portion of claim 3, wherein the hydraulic fluid port extends through a wall of the cylinder portion.

5. The modular actuator portion of claim 3, wherein the hydraulic fluid port extends through the cylinder head portion.

6. The modular actuator portion of claim 3, further comprising:
    a second hydraulic fluid port formed therein.

7. The modular actuator portion of claim 6, wherein the second hydraulic fluid port extends through a wall of the cylinder portion.

8. The modular actuator portion of claim 7, wherein the hydraulic fluid port extends through the cylinder retainer portion.

9. The modular actuator portion of claim 1, wherein the cylinder portion and the cylinder head portion are integral parts of a single component.

10. The modular actuator portion of claim 1, wherein the cylinder portion and the cylinder retainer portion are integral parts of a single component.

11. The modular actuator portion of claim 1, wherein the cylinder portion and the piston retainer portion are integral parts of a single component.

12. The modular actuator portion of claim 11, wherein the cylinder retainer portion is another integral part of the single component.

13. The modular actuator portion of claim 1, wherein the cylinder portion, the cylinder retainer portion, the cylinder head portion, and the piston retainer portion are separable parts.

14. The modular actuator portion of claim 1, wherein the cylinder portion and the piston retainer portion are not integrally formed parts, and further comprising:
    a retainer ring that is snapped into a recess formed in the interior surface of the cylinder portion at the first end of the cylinder portion, wherein part of the retainer ring extends radially inward relative to the interior surface farther than another part of the piston retainer portion such that the piston retainer portion cannot slide past the retainer ring.

15. A modular hydraulic actuator comprising:
    a first modular actuator portion comprising:
        a hollow cylinder portion,
        a cylinder retainer portion located along an outside surface of the cylinder portion and at a first end of the cylinder portion, the cylinder retainer portion having a plurality of screw holes formed therein,
        a piston located in the cylinder portion, the piston being adapted to slidably fit in the cylinder portion, and the piston having a slotted portion formed therein,
        a cylinder head portion closing a second end of the cylinder portion,
        a locking screw extending through the cylinder head portion and threadedly coupled to the cylinder head portion, the locking screw being adapted to press against the piston with an end of the locking screw to displace the piston, and
        a piston retainer portion located at an interior surface of the cylinder portion and at the first end of the cylinder portion, wherein part of the piston retainer portion extends radially inward relative to the interior surface farther than a portion of the piston such that the piston cannot slide completely past the piston retainer portion; and
    a second modular actuator portion comprising:
        a bonnet portion having a central hole formed therethrough, the bonnet portion having a plurality of screw holes formed therein at one end of the bonnet portion, wherein the bonnet portion screw holes correspond to the cylinder retainer portion screw holes,
        an operating stem extending through the bonnet portion central hole, the operating stem having a first end removably coupled to the valve member, and the operating stem having a threaded second end,
        a nut having an exterior shape adapted to slidably interfit with the slotted piston portion, and the nut having a threaded hole formed therein where the nut is threadedly coupled with the threaded second end of the operating stem;
    wherein the first modular actuator portion is removably coupled to the second modular actuator portion with a plurality of fasteners via the cylinder retainer screw holes and the bonnet screw holes; and
    wherein the first modular actuator portion can be separated from the second modular actuator portion without disassembling the first modular portion.

16. The modular hydraulic actuator of claim 15, wherein the bonnet portion of the second modular portion has a second hydraulic fluid port formed therein.

17. The modular hydraulic actuator of claim 15, wherein the slotted portion of the piston has a generally T-shaped cross-section, and the exterior shape of the nut has a generally T-shaped cross-section corresponding to the cross-section of the slotted piston portion.

18. The modular hydraulic actuator of claim 15, wherein the second modular actuator portion further comprises:
   a packing gland threadedly coupled into the bonnet portion about the operating stem, the packing gland being adapted to retain at least one seal.

19. The modular hydraulic actuator of claim 15, wherein the second modular actuator portion further comprises:
   a drift ring located about the operating stem and threadedly engaged with the bonnet portion for the purpose of limiting the stroke of the piston when the actuator is operably assembled.

20. The modular hydraulic actuator of claim 15, wherein the second modular actuator portion can be separated from the first modular actuator portion without disassembling the second modular actuator portion.

21. A hydraulically actuated valve assembly, comprising:
   a valve component comprising:
      a valve body, the valve body having a plurality of screw holes formed therein, and
      a valve member located in the valve body and that slidably fits in the valve body;
   a modular hydraulic actuator comprising a first modular portion and a second modular portion;
   the first modular actuator portion of the actuator comprising:
      a hollow cylinder portion,
      a cylinder retainer portion located along an outside surface of the cylinder portion and at a first end of the cylinder portion, the cylinder retainer portion having a plurality of screw holes formed therein,
      a piston located in the cylinder portion, the piston being adapted to slidably fit in the cylinder portion, and the piston having a slotted portion formed therein,
      a cylinder head portion closing a second end of the cylinder portion,
      a locking screw extending through the cylinder head portion and threadedly coupled to the cylinder head portion, the locking screw being adapted to press against the piston with an end of the locking screw to displace the piston, and
      a piston retainer portion located at an interior surface of the cylinder portion and at the first end of the cylinder portion, wherein part of the piston retainer portion extends radially inward relative to the interior surface farther than a portion of the piston such that the piston cannot slide completely past the piston retainer portion;
   the second modular actuator portion comprising:
      a bonnet portion having a central hole formed therethrough, the bonnet portion having a first plurality of screw holes formed therein at a first end of the bonnet portion, wherein the first plurality of bonnet portion screw holes corresponds to the cylinder retainer portion screw holes, the bonnet portion also having a second plurality of screw holes formed therein at a second end of the bonnet portion, wherein the second plurality of bonnet portion screw holes corresponds to the valve body screw holes,
      an operating stem extending through the bonnet portion central hole, the operating stem having a first end removably coupled to the valve member, and the operating stem having a threaded second end,
      a nut having an exterior shape adapted to slidably interfit with the slotted piston portion, and the nut having a threaded hole formed therein where the nut is threadedly coupled with the threaded second end of the operating stem;
   wherein the first modular actuator portion is removably coupled to the second modular actuator portion with a first plurality of fasteners via the cylinder retainer screw holes and the first bonnet screw holes;
   wherein the first modular actuator portion can be separated from the second modular actuator portion without disassembling the first modular portion; and
   wherein the second modular actuator portion is removably coupled to the valve body with a second plurality of fasteners via the second bonnet screw holes and the valve body screw holes.

22. A method of disassembling a modular actuator component for accessing at least one seal in the modular actuator component, comprising the steps of:
   loosening a plurality of fasteners that hold a first modular portion of the actuator component and a second modular portion of the actuator component together;
      wherein the first modular actuator portion comprises:
         a hollow cylinder portion,
         a piston located in the cylinder portion, the piston being adapted to slidably fit in the cylinder portion, and the piston having a slotted portion formed therein,
         a piston retainer portion located at an interior surface of the cylinder portion and at a first end of the cylinder portion, wherein part of the piston retainer portion extends radially inward relative to the interior surface farther than a portion of the piston such that the piston cannot slide completely past the piston retainer portion,
         a cylinder head portion closing a second end of the cylinder portion, and
         a locking screw extending through the cylinder head portion and threadedly coupled to the cylinder head portion, the locking screw being adapted to press against the piston with a first end of the locking screw for displacing the piston; and
      wherein the second modular actuator portion comprises:
         a bonnet portion having a central hole formed therethrough,
         an operating stem extending through the bonnet portion central hole, the operating stem having a threaded end,
         a nut having an exterior shape that is slidably engaged with the slotted piston portion, and the nut having a threaded hole formed therein that threadedly interfits with the threaded operating stem end, and
         the at least one seal located about the operating stem;
   displacing the piston towards the first end of the first modular portion until the slotted piston portion extends outside of the first modular portion;
   preventing the piston from being completely slid out of the first modular portion through the first end of the cylinder portion with the piston retainer portion;
   sliding the nut out of engagement with the slotted piston portion; and separating the first modular portion from the second modular portion.

23. The method of claim 22, wherein the second modular portion further comprises a packing gland, the packing gland being located about the operating stem and threadedly engaged with the bonnet portion, wherein the packing gland retains the at least one seal; and further comprising the step of unthreading and removing the packing gland from the second modular portion.

24. The method of claim 22, wherein the second modular portion further comprises a drift ring, the drift ring being located about the operating stem and threadedly engaged with the bonnet portion for the purpose of limiting the stroke of the piston when the actuator component is operably assembled; and further comprising the step of unthreading and removing the drift ring from the second modular portion.

25. The method of claim 22, farther comprising the step of:

removing the nut from the operating stem.

26. The method of claim 22, wherein during the displacing piston step, the locking screw is rotated so that the locking screw moves toward the piston and pressed against the piston so that the locking screw displaces the piston.

* * * * *